June 6, 1939.  H. T. LAMBERT  2,161,360
BRAKE MECHANISM
Filed Nov. 10, 1937  5 Sheets-Sheet 1
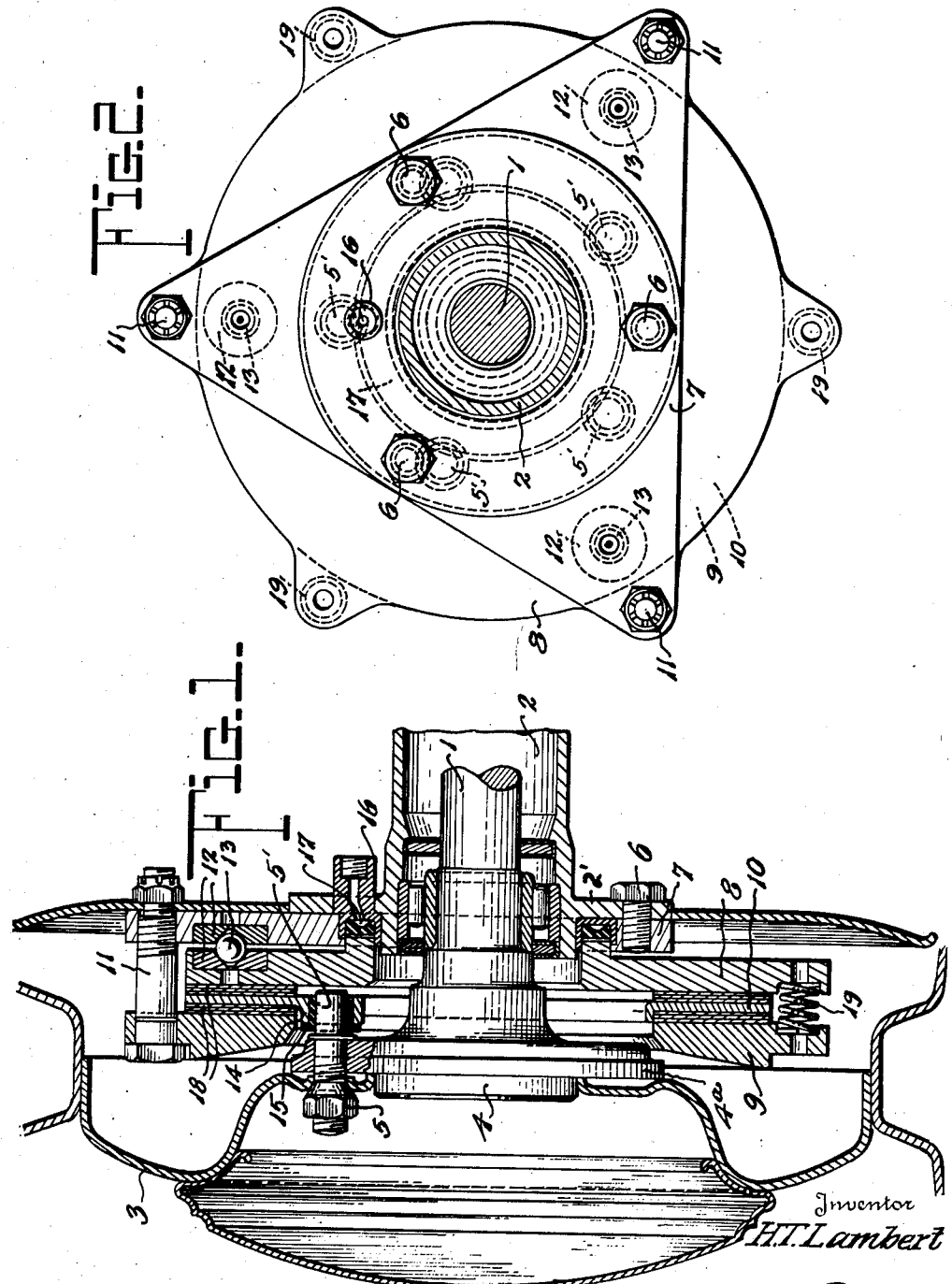
Inventor
H. T. Lambert
By Robb & Robb
Attorneys June 6, 1939.                    H. T. LAMBERT                    2,161,360
                                 BRAKE MECHANISM
                              Filed Nov. 10, 1937              5 Sheets-Sheet 2
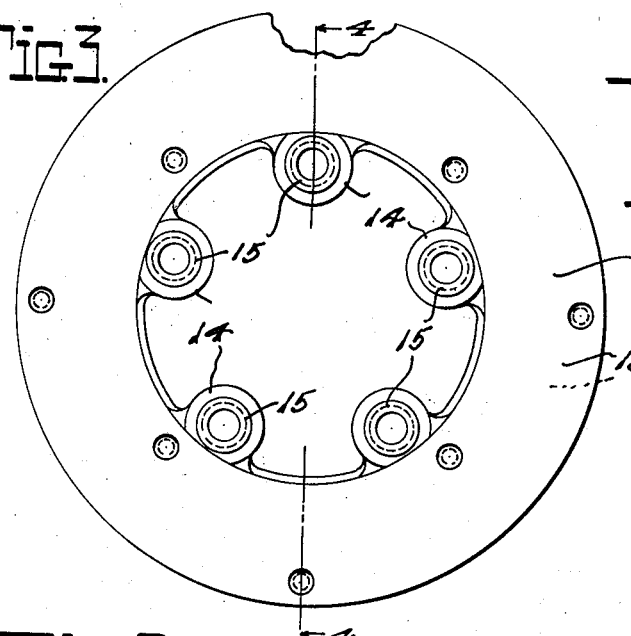
Fig.3.
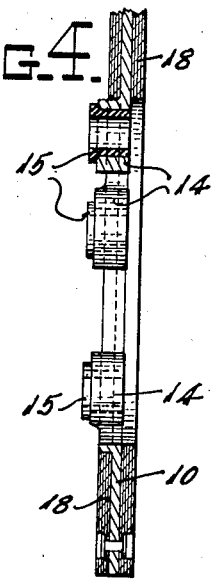
Fig.4.
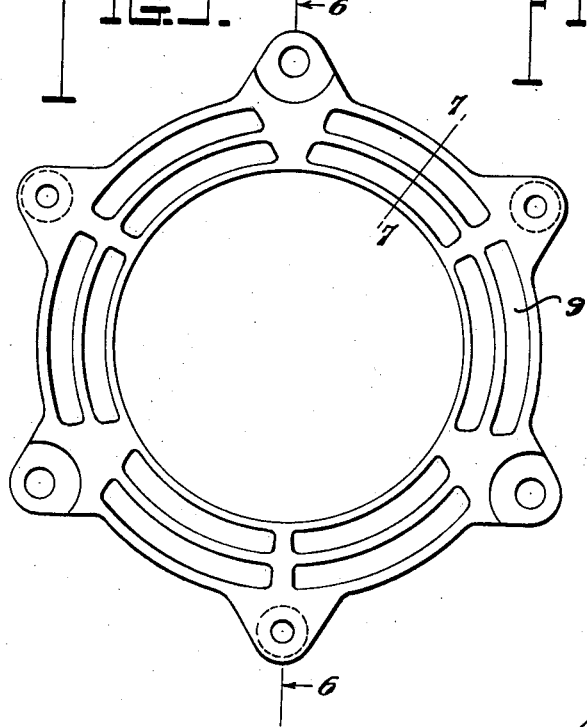
Fig.5.
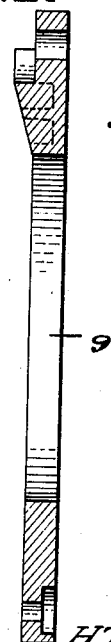
Fig.6.
Fig.7.
Inventor
H.T.Lambert
By Robb & Robb
Attorneys

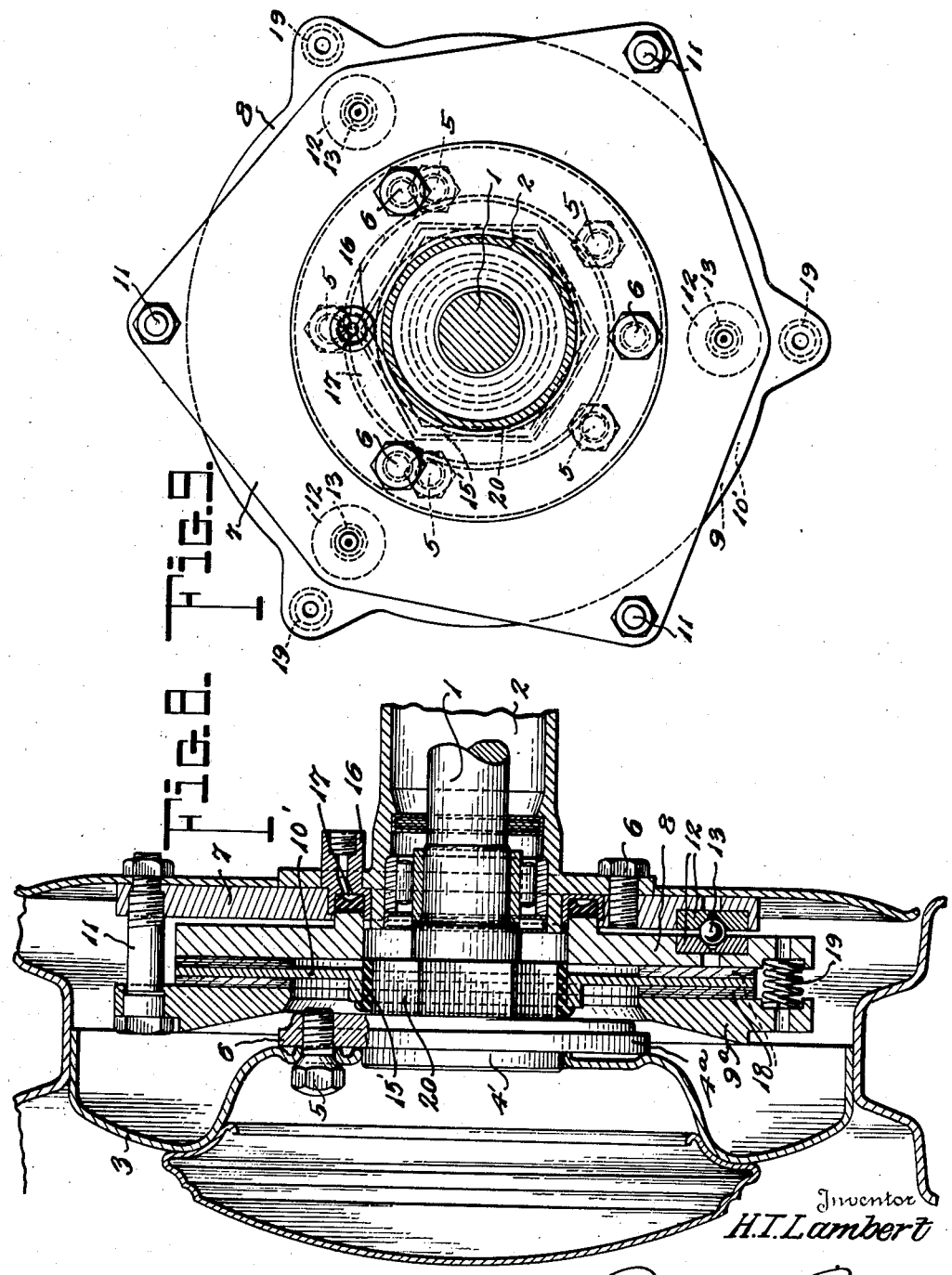

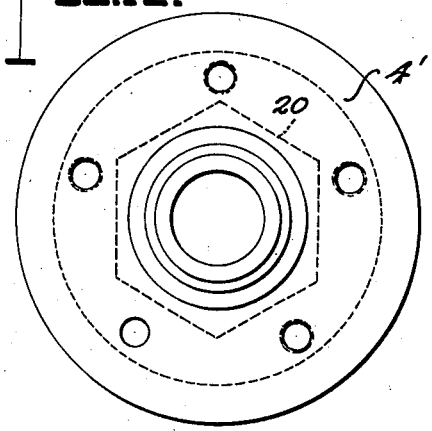
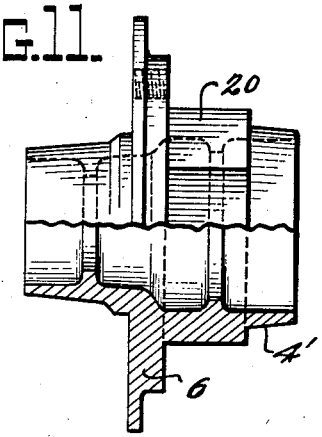
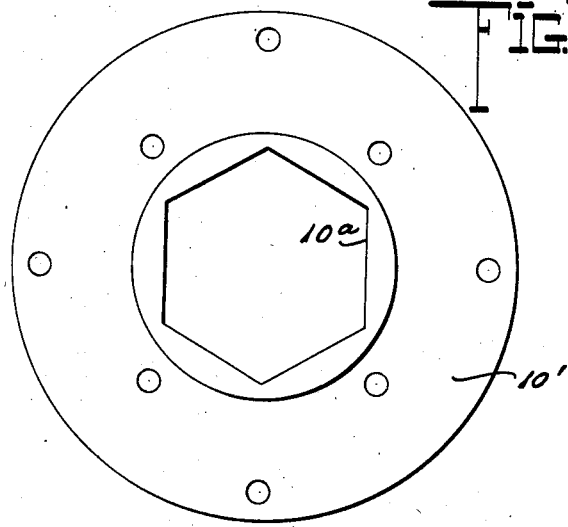
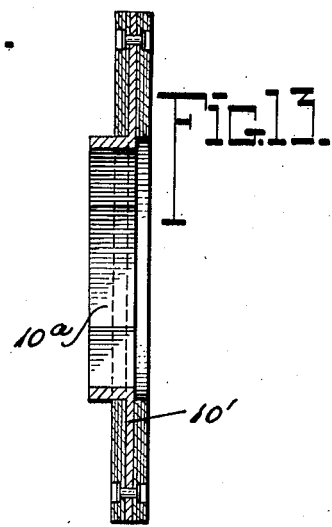
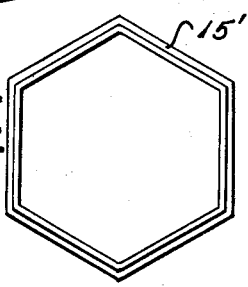
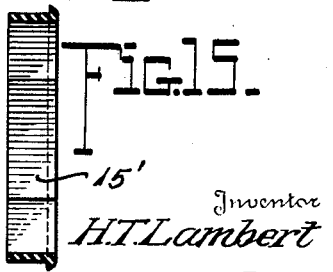

June 6, 1939.   H. T. LAMBERT   2,161,360
BRAKE MECHANISM
Filed Nov. 10, 1937   5 Sheets-Sheet 5
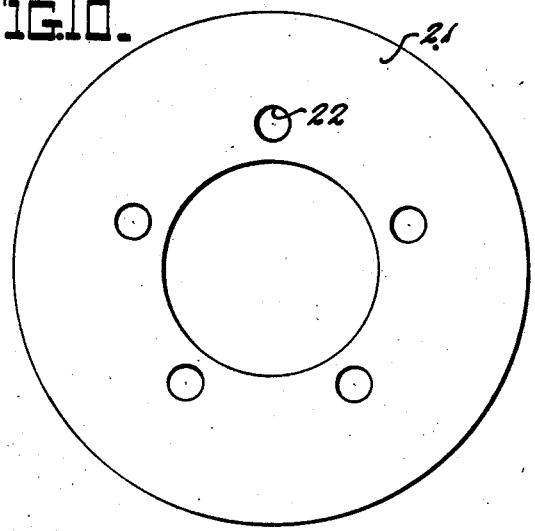
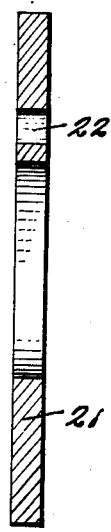
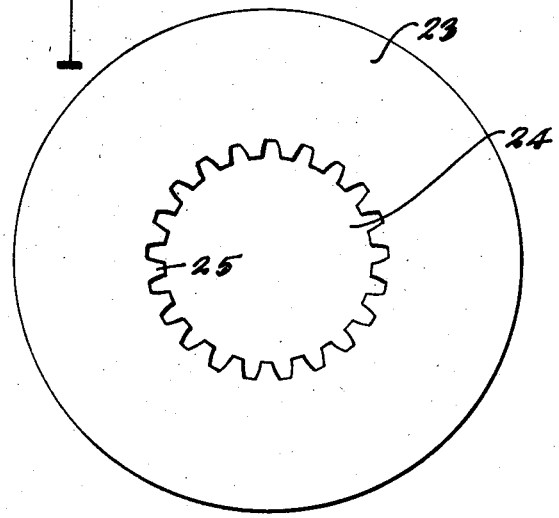
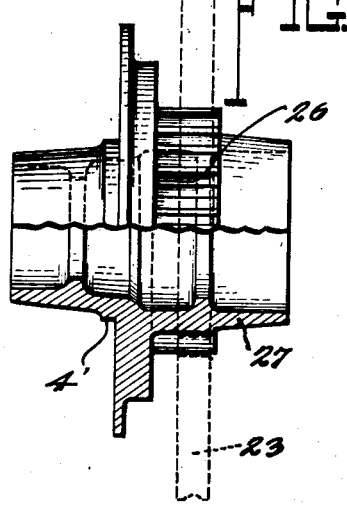
Inventor
H. T. Lambert
By Robb & Robb
Attorneys Patented June 6, 1939

2,161,360

UNITED STATES PATENT OFFICE 2,161,360

BRAKE MECHANISM

Homer T. Lambert, St. Joseph, Mich.

Application November 10, 1937, Serial No. 173,935

4 Claims. (Cl. 188—72)

The present invention relates to improvements in automobile brake constructions and in particular to that type known as self-energizing brakes of a construction similar to that shown in my co-pending application Serial No. 65,549, filed February 24, 1936, of which this is a continuation in part.

The primary feature of these improvements resides in the novel method of mounting the brake ring or disc. I have found in practice that when this ring member is mounted close to the hub or other mounting member in metal-to-metal contact for the purpose of reducing wear to a minimum, bad effects are encountered in that disturbing noises or squeaking were produced and at times, due to the heat generated in the braking, the ring member would become tightened around its mounting, interfering with the desired free floating action.

This problem I have solved by the interposition between the parts of a grommet or bushing of such resilient material and construction as to eliminate noises when brakes are applied or unapplied and insulate the mounting against transfer of heat to wheel bearings, grease and grease seals. In other words, it permits the braking ring to float perfectly and normalizes the spacing between the braking parts, thereby preventing heating at high speeds of operation.

A further object in view is the simplification of the construction whereby manufacture is made cheaper and parts are made more accessible for adjustment or more durable in wear.

Other and further objects and advantages of the invention will be hereinafter set forth and the novel features thereof defined by the appended claims.

In the drawings:

Fig. 1 is a vertical sectional view through one form of construction of my invention;

Fig. 2 is a sectional view showing the brake mechanism unit in elevation;

Fig. 3 is a front elevation of the brake ring;

Fig. 4 is a sectional view taken on the line 4—4 of Fig. 3;

Fig. 5 is a front elevation of the stationary braking disc;

Figs. 6 and 7 are sectional views on the lines 6—6 and 7—7, respectively, of Fig. 5;

Fig. 8 is a vertical sectional view of a modified form of brake mounting;

Fig. 9 is a sectional view of the construction shown in Fig. 9, showing the brake mechanism unit in elevation;

Fig. 10 is a side elevation of the hub construction for the front or steering wheel;

Fig. 11 is a sectional view thereof;

Fig. 12 is a side elevation of the brake ring;

Fig. 13 is a sectional view of the ring;

Figs. 14 and 15 are end and sectional views of the grommet used with the construction shown in Fig. 8;

Figs. 16 and 17 are elevation and sectional views of a modified form of brake ring when made solely of fiber material such as employed for brake linings;

Fig. 18 is an elevation of another modified form of fiber brake ring; and

Fig. 19 is a detail of the construction of wheel hub with which the ring of Fig. 18 is used.

Like reference characters designate corresponding parts in the several figures of the drawings.

Referring to the drawings, and in particular to that form of the invention illustrated in Fig. 1, I designates the rear axle of a vehicle mounted within the housing 2 in the customary manner and having keyed thereon the rear or driving wheel 3. The body portion of the wheel is attached to the wheel hub 4 by means of specially formed stud bolts 5 which extend through and beyond the hub flange 4a. The inner ends of these stud bolts indicated at 5' constitute the mountings for the brake ring or disc forming a part of the brake mechanism unit now to be described.

The brake mechanism of this construction is in the form of a compact unit simplified to a considerable extent in comparison with the construction shown in my co-pending application hereinbefore referred to, and for this reason much easier to assemble or disassemble and much more quickly and readily adjustable to take up wear and tear.

The unit is attached to the end flange 2' of the axle housing 2 as by means of the cap screws 6. This brake unit is composed of the energizer plate 7 into which the screws 6 extend, the actuating or pressure producing plate 8, the stationary friction disc 9, and the brake ring 10. These members are connected together as a unit by the brake adjusting bolts 11 arranged at the periphery of the unit to extend through the plates 7 and 9. It will be apparent that access to these bolts may readily be had when the wheel is removed.

Each of the members 7 and 8 is provided with hardened steel discs 12 arranged in recesses and in opposing pairs and formed with conical recesses to receive the energizer elements in the form of spherical balls 13 by means of which axial movement may be imparted to the pressure plate 8 supplemental to the axial movement produced by the hydraulic fluid medium in the manner hereinafter set forth.

As herein premised, the brake ring is provided with a series of openings 14 in each of which is disposed a grommet or bushing 15 composed of fibrous material, rubber or other resilient material suitable for the purpose. These bushings are slidably received by the ends 5' of the bolts 5 which secure the wheel body to the hub 4.

It is to be understood that the brake ring may be shifted laterally upon the mounting members 5' as pressure is produced by the actuating disc 8, which in turn is actuated by pressure fluid from a suitable source. In the customary manner a conduit for this purpose is connected to the nipple 16 leading to the annular chamber 17 extending about the inner periphery of the pressure plate 8.

The faces of the brake member are provided with the friction linings 18 in the customary manner. Contact of the surfaces of these linings under normal conditions is eliminated by means of the expansion springs 19 interposed between the stationary plate 9 and the pressure plate 8.

The operation of this simple form of brake mechanism will be apparent from the foregoing description. The pressure fluid admitted to the brake unit in the manner above described shifts the pressure plate 8 into contact with the brake ring. As soon as the brake ring is contacted, rotative motion is imparted to the pressure plate 8 which in turn causes the camming members 13 to ride up the inclined planes of their conical seats. Such movement of these members imparts additional axial movement to the pressure plate 8 and very effective braking action is therefore produced. In the rotation or annular movement of the pressure plate 8, the springs 19 are distorted and as soon as the pressure is released these springs tend to shift the pressure plate back to normal position, as shown in Fig. 1 of the drawings.

The interposition of the grommets or bushings in the mounting of the brake plate eliminates any tendency for screeching or rattling during operation of the vehicle and at the same time these elements maintain the parts in their proper condition for effectively performing their function, as stated in the foregoing description.

Passing now to that form of my construction shown in Fig. 8, it will be noted that in the main the construction is essentially like that shown in Fig. 1 and, therefore, the same characters of reference are applied to most of the parts. The main point of distinction between these two constructions resides in the formation of the hub 4' of the wheel, shown more particularly in Figs. 10 and 11, which in this instance is provided with a hexagonal shape or shoulder, as indicated at 20, at one side of the attaching flange 6.

In order to mount the brake ring 10, which is shown most clearly in Figs. 12 and 13, this member is provided with a hexagonal opening 10a conforming to the shape of the shoulder 4'. In this instance again a grommet or bushing 15' is disposed in the brake ring opening so as to seat upon the shoulder 20. This member 15' is shown clearly in Figs. 14 and 15 of the drawings. The same resilient noise eliminating action is produced by this arrangement as referred to with respect to the first form described.

In Figs. 16 to 19 I have shown a further modification of the braking member for the purpose of eliminating noise. In Fig. 16 this brake member 21 is circular in form and provided with a series of openings 22 to receive the ends 5' of the fastening studs shown in Fig. 1. By reason of the fact that the whole of the brake member or ring is composed of fibrous material similar to brake linings, elimination of the thin type of lining for the friction surface is accomplished and elimination of noises will necessarily follow with the employment of this type of brake member.

In Fig. 18 the brake member 23 is also made in its entirety of the friction material referred to. However, the periphery of the inner opening 24 of this brake member is toothed, the teeth 25 being designed to mesh with teeth 26 formed on the wheel hub 27 to take the place of the hexagonal shoulder provided in the construction of Fig. 11. The brake member 23 in this construction is slidably mounted so as to shift axially during brake application and release of such braking action.

Other changes may be made in the details of construction of the invention hereinbefore set forth without departing from the spirit of the invention and within the scope of claims appended hereto.

Having thus described my invention, what I claim as new and desire to secure by Letters Patent is:

1. In combination, an axle support, a brake unit connected thereto composed of a stationary plate, a pressure plate, a rotatable braking member between said plates, a wheel hub co-acting with said axle support, stud members for connecting a wheel to the hub, said braking member having a series of openings for mounting it upon the stud members, and a non-metallic bushing in each of the mounting openings of said braking member.

2. In combination, an axle support, a brake unit connected thereto composed of a stationary plate, a pressure plate, a rotatable braking member between said plates, a wheel hub coacting with said axle support, means for connecting a wheel to the hub, said means constituting a support for the rotatable braking member, and insulating means between the braking member and the connecting means aforesaid.

3. In combination, an axle support, a brake unit connected thereto composed of a stationary plate, a pressure plate, a rotatable braking member between said plates, a wheel hub coacting with said support, stud members for connecting a wheel to the hub and having extensions upon which said rotatable braking member is mounted, and insulating means on said extensions to receive the rotatable braking member whereby to prevent transmission of vibrations from said braking member to the wheel.

4. In combination, an axle support, a brake unit connected thereto composed of a stationary plate, means connecting said stationary plate to the axle support, a pressure plate, a rotatable braking member between said plates, a wheel hub coacting with said support, means for connecting a wheel to said hub and for supporting the rotatable braking member in operative position between said plates, insulating means between the braking member and said supporting and connecting means, and power-actuated means for shifting the braking member on its support into contact with the stationary plate.

HOMER T. LAMBERT.